United States Patent [19]

Bruggendieck

[11] Patent Number: 5,054,880
[45] Date of Patent: Oct. 8, 1991

[54] METHOD OF MANUFACTURING AN OPTICAL LINE

[75] Inventor: Siegfried Bruggendieck, Bergisch Gladbach, Fed. Rep. of Germany

[73] Assignee: U.S. Philips Corp., New York, N.Y.

[21] Appl. No.: 446,494

[22] Filed: Dec. 5, 1989

[30] Foreign Application Priority Data

Dec. 24, 1988 [GB] United Kingdom ............... 3843778

[51] Int. Cl.$^5$ .................. G02B 6/44; B65H 20/24; B65H 18/28
[52] U.S. Cl. ............................. 385/111; 385/112; 226/2; 226/6; 226/119; 242/171; 242/172
[58] Field of Search ............. 350/96.10, 96.23, 96.30, 350/320; 226/119, 194, 2, 6; 242/7.02, 7.22, 18.1, 128, 171, 172

[56] References Cited

U.S. PATENT DOCUMENTS

| 4,028,081 | 6/1977 | Marcatili ............... 350/96.23 X |
| 4,640,576 | 2/1987 | Eastwood et al. ............ 350/96.23 |
| 4,759,602 | 7/1988 | Pascher ..................... 350/96.23 |
| 4,979,794 | 12/1990 | Evans ....................... 350/96.23 |

Primary Examiner—Brian Healy
Attorney, Agent, or Firm—Ernestine C. Bartlett

[57] ABSTRACT

The invention relates to a method of manufacturing an optical line, in which at least one LWG (4, 11, 15, 19) extends in an envelope (3, 9, 13, 18) with excess length and is fixed with respect to the envelope by positioning elements (7, 8, 12, 20). The adjustment of an exactly defined excess length of one or several LWGs is made possible without the use of expensive manufacturing devices in that the positioning elements (7, 8, 12, 20) are provided on the LWGs (4, 11, 15, 19) prior to or during the insertion in the envelope (3, 9, 13, 18) and that the LWGs are pulled in by unreeling forces acting on the envelope (3, 9, 13, 18).

8 Claims, 1 Drawing Sheet

METHOD OF MANUFACTURING AN OPTICAL LINE

BACKGROUND OF THE INVENTION

The invention relates to a method of manufacturing an optical line, in which at least one LWG extends in an envelope with excess length and is fixed with respect to the envelope by positioning elements.

In a method of this type disclosed in U.S. Pat. No. 4,039,248 an LWG is formed in an extruded envelope by means of a sliding transport mechanism with such an excess length that the LWG extends inside the envelope with a corrugated shape. The LWGs are then fixed in the corrugated position with respect to the envelope, for example, by means of prefabricated flexible foamed members which are disposed in the envelope. The driving speed of the transport mechanism must be exactly adapted to the extrusion rate. A sliding insertion of an LWG into an envelope presents difficulties because an uncontrolled buckling may occur.

In addition to individual LWG's, it must also be possible to provide LWG-flat cables—in which several LWGs are combined beside each other so as to form an LWG-flat cable—with excess length in an envelope. Stacks of LWG flat cables which extend in an envelope in a twisted manner should also extend preferably in a corrugated manner or helically to form excess length (compare West Germany Patent Application P 38 02 867.0).

SUMMARY OF THE INVENTION

An object of the invention is to provide a method of the type mentioned in the opening paragraph which enables the production of an optical line in which a defined excess length position of one or more LWGs with reliably previously determined extent of excess length without expensive manufacturing devices being necessary.

This object is achieved in that the positioning elements are provided on the LWGs prior to or during the insertion in the envelope and that the LWG is pulled in by unreeling forces acting on the envelope.

In the method according to the invention LWGs can be drawn in common with the envelope in the usual manner without upsetting sliding occurring. Unreeling forces influencing the LWGs should be as small as possible so that the soft positioning elements are not deformed already during the manufacture, as a result of which a part of the excess length might be lost by stretching of the LWGs.

The positioning elements may advantageously be provided by injection nozzles which extend axially in the envelope. In that case inlet apertures need not be provided in the envelope.

When the positioning elements are provided in different angular positions, the LWGs may be guided in the envelope helically. In a particularly simple practical solution, it is ensured that the positioning elements are provided alternately in angular positions differeing by 180°. In this case a corrugated position of the LWG is obtained.

The method according to the invention relates to a single LWG, a bundle of LWGs, an LWG-flat cable or a stack of LWG-flat cables.

In the case of an LWG-flat cable, it is ensured that the positioning elements are provided on the wide side of the cable.

When a corrugated position of the LWG-flat cable is to be produced, the positioning elements must be distributed alternately on oppositely located wide sides of the LWG-flat cable. In the case of a desired helical position, positioning elements are to be distributed on only one wide side of a twisted LWG-flat cable.

Similar aspects also apply when instead of a single LWG-flat cable a stack of several piled LWG-flat cables are to be provided with excess length in a common envelope.

In an alternative embodiment of the method according to the invention, it is ensured that the positioning elements are provided on all the LWG-flat cables of a plurality of LWG-flat cables guided in an envelope. The positioning elements may already be provided on the individual LWG-flat cables independently of the extrusion process of the envelope. The thickness of the positioning elements is to be chosen to be such that, with a stretched variation of a group of piled LWG-flat cables provided with positioning elements, an envelope contour is obtained the outside dimensions of which exceed the inside diameter of the envelope to be provided. The stack will then be compressed during the introduction into the envelope in such a manner that the individual LWG-flat cables assume a corrugated variation.

BRIEF DESCRIPTION OF THE DRAWING

The invention will now be described in greater detail with reference to the accompanying drawing, in which.

DETAILED DESCRIPTION OF THE PREFERRED EMBODIMENT

Figure 1:
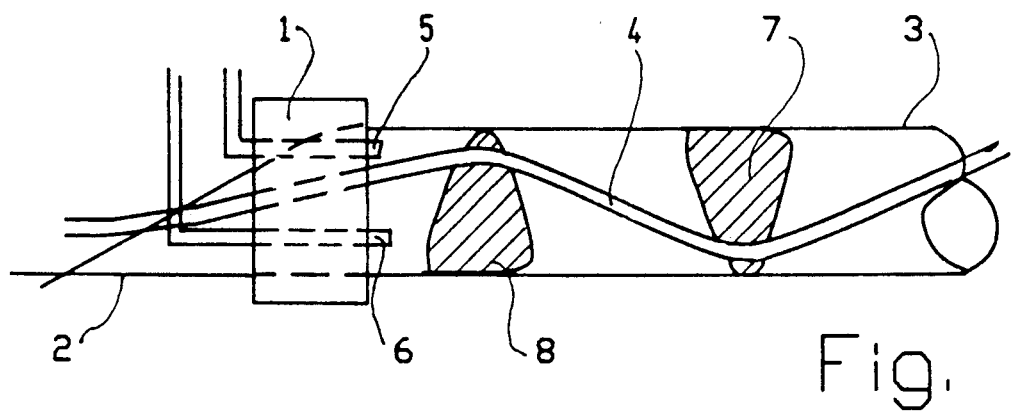
FIG. 1 shows essential elements of a device for inserting an LWG into an envelope formed from metal according to the invention.

By means of a conventional shaping device 1 a tube is formed from a high-grade steel strip 2 and welded in the seam to form a metal tube 3 which forms an envelope for an LWG 4.

Upon drawing the metal tube 3 out of the shaping device 1, the LWG 4 is unreeled with a small unreeling force from a storage reel not shown. Stoppers 7 and 8, respectively, are formed by an upper injection nozzle 5 and by a lower injection nozzle 6 which extend axially in the section of the metal tube 3 just formed. As a result of the injection, the LWG is transported towards the inner surface of the metal tube so that a corrugated variation is obtained. The stoppers 7 and 8 preferably consist of a soft flexible foam.

In FIG. 1, an embodiment of a single injection nozzle is provided which is rotatable about the central axis of the metal tube 3 and can be adjusted in positions changing by 180°. It is further possible to form stoppers in smaller differential angular positions so that the LWG is moved in a helical position.

Figure 2:
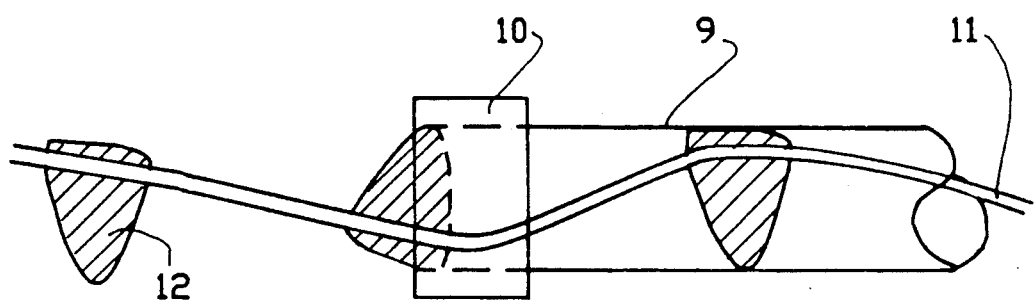
FIG. 2 explains a modified method according to the invention for inserting an LWG into an extruded envelope.

As shown in FIG. 2, an envelope 9 is extruded by an extruder 10 shown diagrammatically. The LWG 11 which is unreeled with the envelope and which is again unreeled from a storage reel not shown with a small unreeling force, was provided with positioning elements 12 provided in positions rotated through 180° with respect to each other before entering the envelope 9.

The methods explained with reference to FIGS. 1 and 2 for the case of a single LWG may, of course, also be used for bundles of LWG's, for LWG-flat cables or for stacks of LWG-flat cables.

Figure 3:
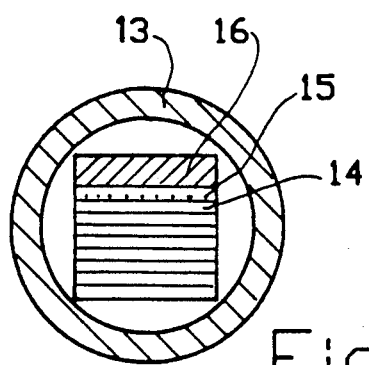
FIG. 3 is a cross-sectional view through an optical cable manufacturted according to the invention with a stack of LWG-flat cables.

FIG. 3 is a cross-sectional view through an optical line in which ten LWG-flat cables extend as a stack in an envelope 13. Each LWG-flat cable 14 comprises ten LWGs 15 bonded together in one plane. A positioning element 16 manufactured according to FIG. 2 transports the stack in the envelope 13 eccentrically downwards. A subsequent oppositely located positioning element rotated through 180° transports the stack upwards so that the whole stack then assumes a corrugated position.

When in the case of a twisted stack the positioning shift elements 16 are provided on one side only, a helical variation of the stack of LWG-flat cables is superimposed on the twist.

Figure 4:
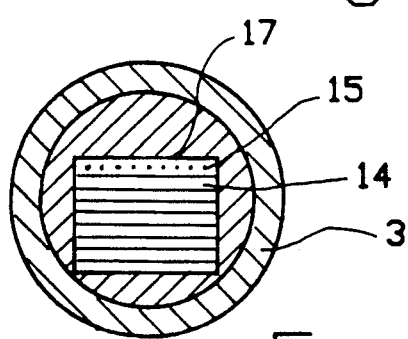
FIG. 4 is a cross-sectional view through an optical cable manufactured in a modified form according to the invention with a stack of LWG-flat cables.

FIG. 4 is a modified embodiment of the FIG. 3 positioning element which was manufactured according to FIG. 1 as a stopper 17 and simultaneously has a longitudinally water-tight effect. The further elements correspond to those of FIG. 3.

Figure 5:
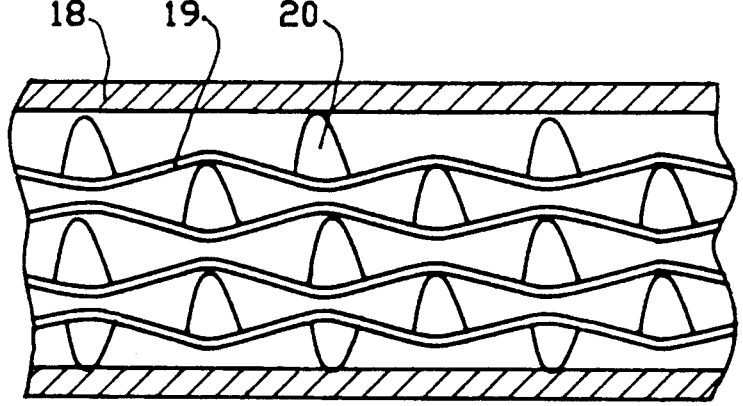
FIG. 5 is a longitudinal sectional view through an optical cable comprising several LWG-flat cables, in which all the LWG-flat cables are provided with positioning elements.

As shown in FIG. 5, four LWG-flat cables 19 are guided in a corrugated position in an envelope 18. The corrugation is produced by stoppers or strips 20 which were previously provided on each of the LWG-flat cables and which were provided on both sides only of the lowermost LWG-flat cable 19 in order that this one also assumes a corrugated variation. It is not necessary for the stoppers to succeed each other with absolutely equal distances. The relative position of the stoppers 20 provided on the various LWG-flat cables 19 need not be uniform or symmetrical. Statistically distributed irregularities have even proved to be advantageous.

Distances and thicknesses of the stoppers can be predetermined in such a manner that a desired excess length of the LWG-flat cables 19 is adjusted.

In the embodiments shown in FIGS. 1 to 4 the extent of excess length with a given inside diameter of the envelope 3 is determined in particular by the distance of the positioning elements 7 and 8 and 12, respectively.

I claim:

1. A method of manufacturing an optical line, in which at least one LWG (4, 11, 15, 19) extends with excess length in an envelope (3, 9, 13, 18) and is fixed with respect to the envelope by positioning elements (7, 8, 12, 20), characterized in that the positioning elements (7, 8, 12, 20) are being formed while provided on the at least one LWG (4, 11, 15, 19) prior to or during the insertion in the envelope (3, 9, 13, 18) and that the LWGs are pulled in by unreeling forces acting on the envelope (3, 9, 13, 18).

2. A method as claimed in claim 1, characterized in that the positioning elements (7, 8) are provided by injection nozzles (5, 6) extending axially in the envelope (3).

3. A method as claimed in claim 1, characterized in that the positioning elements (7, 8, 12, 20) are provided in different angular positions.

4. A method as claimed in claim 3, characterized in that the positioning elements (7, 8, 12, 20) are provided alternately in angular positions differing 180°.

5. A method as claimed in any of the claims 1, characterized in that the at least one LWG has a wide side and that the positioning elements (16, 17, 20) are provided on the wide side of the at least one LWG formed as a LWG-flat cable (13, 19).

6. A method as claimed in claim 5, characterized in that the LWG-flat cable includes a stock of LWG-flat cables and that the positioning elements (16, 17, 20) are provided alternately on the wide sides of oppositely located outermost LWG-flat cables of the stack of LWG-flat cables.

7. A method as claimed in claim 5, characterized in that the LWG-flat cable includes a twisted stack of LWG-flat cables and that the positioning elements (16) are provided only on the wide side of an outermost LWG-flat cable (14) of the twisted stack of LWG-flat cables.

8. A method as claimed in any one of the claims 1 to 7, characterized in that the at least one LWG is a LWG-flat cable of a plurality of LWG-flat cables and that the positioning elements (20) are provided on all the LWG-flat cables (19) of the plurality of LWG-flat cables guided in an envelope (18).

* * * * *